United States Patent
Nicolaidis

(10) Patent No.: US 7,493,549 B2
(45) Date of Patent: Feb. 17, 2009

(54) ELECTRONIC CIRCUITS ASSEMBLY COMPRISING AT LEAST ONE MEMORY WITH ERROR CORRECTING MEANS

(75) Inventor: Michel Nicolaidis, Saint Egreve (FR)

(73) Assignee: IROC Technologies, Grenoble (FR)

( * ) Notice: Subject to any disclaimer, the term of this patent is extended or adjusted under 35 U.S.C. 154(b) by 1179 days.

(21) Appl. No.: 10/485,662

(22) PCT Filed: Aug. 2, 2002

(86) PCT No.: PCT/FR02/02785

§ 371 (c)(1),
(2), (4) Date: Feb. 3, 2004

(87) PCT Pub. No.: WO03/014931

PCT Pub. Date: Feb. 20, 2003

(65) Prior Publication Data

US 2004/0193967 A1    Sep. 30, 2004

(30) Foreign Application Priority Data

Aug. 10, 2001   (FR) .................................. 01 10735

(51) Int. Cl.
*G11C 29/00* (2006.01)
(52) U.S. Cl. .................. 714/763; 714/747; 714/718
(58) Field of Classification Search .................. 714/747, 714/15, 47, 25, 763, 718
See application file for complete search history.

(56) References Cited

U.S. PATENT DOCUMENTS

| 4,164,017 A | * | 8/1979 | Randell et al. ................. 714/15 |
| 4,412,314 A | * | 10/1983 | Proebsting ................... 365/222 |
| 4,562,538 A | * | 12/1985 | Berenbaum et al. ........... 714/15 |
| 4,866,717 A | * | 9/1989 | Murai et al. ................. 714/765 |

(Continued)

FOREIGN PATENT DOCUMENTS

EP    0 037 705 A1    10/1981

(Continued)

OTHER PUBLICATIONS

"Memory Card Data Fastpath", IBM Technical Disclosure Bulletin, IBM Corp., New York, vol. 30, No. 10, Mar. 1, 1988, pp. 637-638.

(Continued)

*Primary Examiner*—Esaw T Abraham
*Assistant Examiner*—Fritz Alphonse
(74) *Attorney, Agent, or Firm*—Oliff & Berridge, PLC

(57) ABSTRACT

An electronic circuit assembly having at least one memory with error correction. The assembly has at least one memory with an error detection circuit and an error correction circuit. The error detection circuit is short-circuited if no error is detected by the detection circuit. The data read in the memory are transmitted directly to a first stage of the assembly and, at the same time, to the error detection and correction circuits. If the detection circuit detects an error, it controls transmission to the first stage, by use of a multiplexer, of the data corrected by the correction circuit and performs decontamination of the stages liable to have been contaminated by the erroneous data. Each stage has a latch, the detection circuit then also holds the latches of the successor stages until the data has been corrected in the first stage.

8 Claims, 10 Drawing Sheets

U.S. PATENT DOCUMENTS 4,945,510 A * 7/1990 Maeda et al. .................. 714/15
5,119,483 A * 6/1992 Madden et al. ............... 714/15
7,159,152 B2 * 1/2007 Von Wendorff ............. 714/47

FOREIGN PATENT DOCUMENTS

EP          1 054 327  A1    11/2000
GB          2 064 840  A     6/1981

OTHER PUBLICATIONS

"Memory Access with Error Recovery", IBM Technical Disclosure Bulletin, IBM Corp., New York, vol. 30, No. 10, Mar. 1, 2988, pp. 133-135.

* cited by examiner

ELECTRONIC CIRCUITS ASSEMBLY COMPRISING AT LEAST ONE MEMORY WITH ERROR CORRECTING MEANS

BACKGROUND OF THE INVENTION

The invention relates to an electronic circuits assembly comprising at least one memory and means for detecting and correcting errors in the data supplied by the memory during a read operation, the output of the memory being connected in parallel to an input of an error detection circuit, to an input of an error correction circuit and to the input of a first stage, the error detection circuit controlling transmission of the corrected data to the first stage after an error has been detected.

STATE OF THE ART

Electronic circuit memories are subject to various types of disturbances, such as particle bombardments, in particular by ionizing particles and neutrons. Thus an ionizing particle can, via the drain of an off transistor, cause an electric pulse modifying the state of a memory cell.

This type of error may affect the reliability of the electronic circuits assemblies comprising such memories, more particularly in the field of nanotechnologies in which the voltage levels and node capacitance values are more and more decreasing.

The use of memory cells insensitive to radiation, called hardened cells, has been proposed in the prior art to overcome this problem. Another proposed solution consists in associating error check codes with the useful data stored in a memory, these codes being able to be either error detection codes or error correction codes such as the Hamming code. It has also been proposed (EP-A-765,497) to correct such errors by combining detection of a current increase in a power supply line of a memory cells column and identification of the row of memory cells corresponding to the affected word, by means of a parity code associated to each word.

One of the major drawbacks of known error correction means is that they reduce the operating speed of the electronic circuits assemblies comprising a memory with error correcting means due to the time required for correcting an error after a read operation and/or determination of an error check code before a write operation.

The document EP-A-1,054,327 and the article "Memory Card Data Fastpath" (IBM Technical Disclosure Bulletin, February 1994, vol.37, n° 2A) describe data transmission systems between a memory and a processor in which the error correcting means are short-circuited if no error is detected.

OBJECT OF THE INVENTION

An object of the invention is to overcome these shortcomings and to enable enhancement of the operating speed of an electronic circuits assembly comprising at least one memory with error correcting means.

This object is achieved by an assembly according to the accompanying claims and more particularly by the fact that, the memory being serially connected with a plurality of successive stages, the output of the detection circuit controls decontamination means of the successor stages liable to be contaminated by an error before detection of the latter.

According to a development of the invention, the decontamination means preferably comprise means for enabling, when an error has been detected, the assembly to be held in its present state while data correction is performed by the correction circuit, and means for then sending the corrected data to the first stage while at the same time holding the circuits not liable to have been contaminated.

According to a second development of the invention, the assembly can comprise means for replacing the incorrect data in the memory by corrected data supplied by the error correcting means when an error has been detected.

According to another development of the invention, the circuits assembly comprising first latches liable to be affected by the error, second latches not liable to be affected by the error and supplying data that can be used by a first successor latch, the decontamination means comprise, for each second latch, a multiplexer comprising an input directly connected to the output of the associated second latch and an input connected to said output by means of a buffer register of first-in first-out (FIFO) type.

The circuits assembly comprising third latches belonging to a furthest attainable source set, the decontamination means preferably comprise, for each third latch, a multiplexer comprising an input directly connected to the output of the associated third latch and an input connected to said output by means of a buffer register of FIFO type.

Each buffer register preferably comprises a preset number of cells depending on the distance separating the corresponding latch from the memory and from latches belonging to a furthest attainable set.

Another object of the invention is also to achieve means enabling operation of the assembly to be speeded up when writing in the memory is performed.

According to the invention, this object is achieved by the fact that the assembly comprises a first code generating circuit having an input connected to the input of the memory and an output connected to the input of a code memory supplying a first code, the error detecting and correcting means comprising a second code generating circuit having an input connected to the output of the memory and supplying a second code, and means for comparing the first and second codes supplied by the code memory and by the second code generating circuit.

BRIEF DESCRIPTION OF THE DRAWINGS

Other advantages and features will become more clearly apparent from the following description of particular embodiments of the invention, given as non-restrictive examples only and represented in the accompanying drawings, in which.

DESCRIPTION OF PARTICULAR EMBODIMENTS

Figure 1:
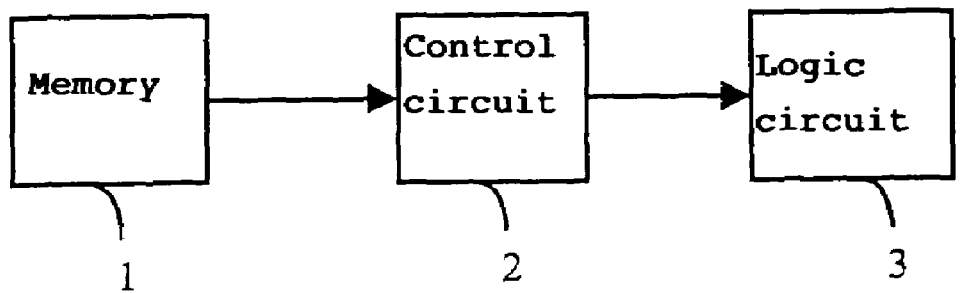
FIG. 1 illustrates an assembly of circuits according to the prior art.

As represented in FIG. 1, the data supplied by a memory 1 and designed to be used by electronic circuits, for example by a microprocessor, can be checked by a control circuit 2 before being sent to a logic circuit 3 of a first data processing stage. Systematic correction of the data by control circuit 2 systematically slows down transmission of the data to the user circuit.

However, as errors are relatively rare, it is not indispensable to systematically submit the data to a correction stage and it is possible to improve the operating speed of the circuits assembly without giving up detection and correction of errors in the data supplied by the memory when a read operation is performed.

Figure 2:
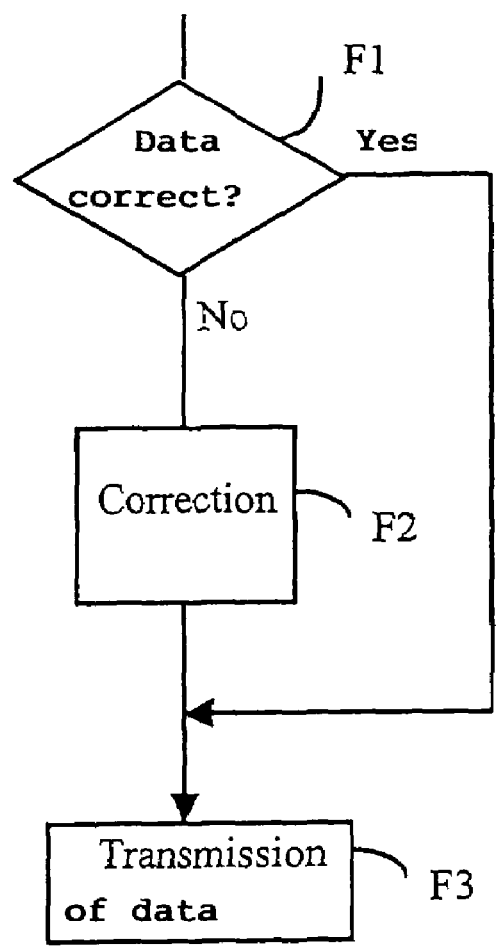
FIG. 2 represents a flowchart enabling operation of a checking circuit according to the prior art to be speeded up.

Operation of a control circuit 2 according to the prior art can notably be enhanced in the manner illustrated schematically by the flowchart of FIG. 2. In a first stage F1, control circuit 2 checks whether the data received are correct, by means of a checking code associated to the data supplied by memory 1. If an error is detected (No output of F1), the control circuit then corrects the data in a step F2. A third step F3 of transmission of the data, corrected if necessary, follows the step F2 or directly the step F1 if no error was detected (Yes output of F1). The correction step F2, which is short-circuited if no error is detected, is therefore only performed in case of necessity and the speed is thus substantially enhanced. However detection of an error by means of a checking code, such as the Hamming code, designed to be used for data correction, requires a certain time.

The additional use of an error detection circuit using for example a simple parity code, faster than a checking code necessary to perform a correction, enhances the operating speed of the system even further. In this case, two different codes are associated to the data in the memory. The error detection step F1 is performed by an error detection circuit of control circuit 2 using a first code, for example a parity code, whereas the step F2, which is only seldom necessary, is performed by a correction circuit of the control circuit using a second code, for example the Hamming code, requiring a longer time but enabling the data to be corrected.

However, even the time necessary for checking a simple parity bit remains significant and it may be desirable to improve the operating speed even further by completely eliminating this type of delay, without however giving up error detection and correction. The information output from the memory when a read operation is performed is therefore sent without delay to the first processing stage and, in parallel, to an error detection circuit and to an error correction circuit. If there is no error in the read data, the system operates correctly at full speed.

If an error is detected by the error detection circuit, the corrected data are then sent to the first data processing stage under the control of the error detection circuit. However, if the operating speed is high, the erroneous data will have already been sent to the successors, in a way contaminating a part of the assembly. It is then necessary to provide decontamination means of the circuits able to have been contaminated by an error before the latter was detected.

The decontamination means essentially have to enable the assembly to be held in its present state, when an error has been detected, while data correction is performed by the correction circuit, and then enable the corrected data to be sent to the first stage while holding in their present state the circuits not able to have been contaminated. In conventional manner, data transmission within the assembly is performed under the control of a clock, each clock cycle, or a preset number of clock cycles, causing data transmission between two successive components of the assembly. The decontamination means depend on the type of assembly in which the memory is used.

Figure 3:
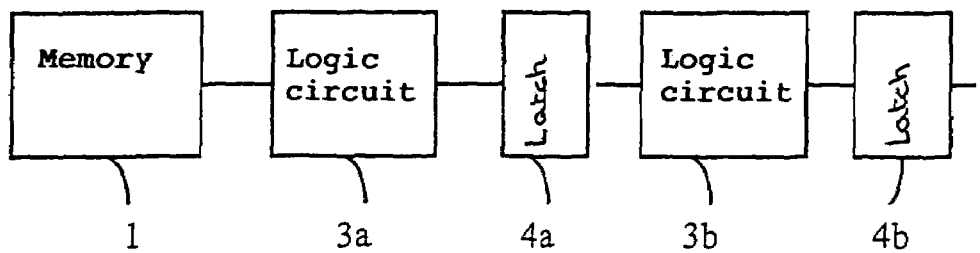
FIG. 3 illustrates a first type of circuits assembly in which the invention can be used.

FIG. 3 schematically illustrates a first type of assembly in which the invention can be implemented. Memory 1 is serially connected with a plurality of successive stages, only two whereof are represented in FIG. 3. Each stage is formed by a latch 4 (4a for the first stage, 4b for the second stage, etc.) which can be preceded by a logic circuit 3 (3a for the first stage, 3b for the second stage, etc.). The data read in memory 1 are first of all processed in logic circuit 3a of the first stage. The processed data are then stored in the first stage latch 4a before being processed in the second stage logic circuit 3b. The second stage latch 4b stores the data processed by logic circuit 3b before sending them to a next stage.

Figure 4:
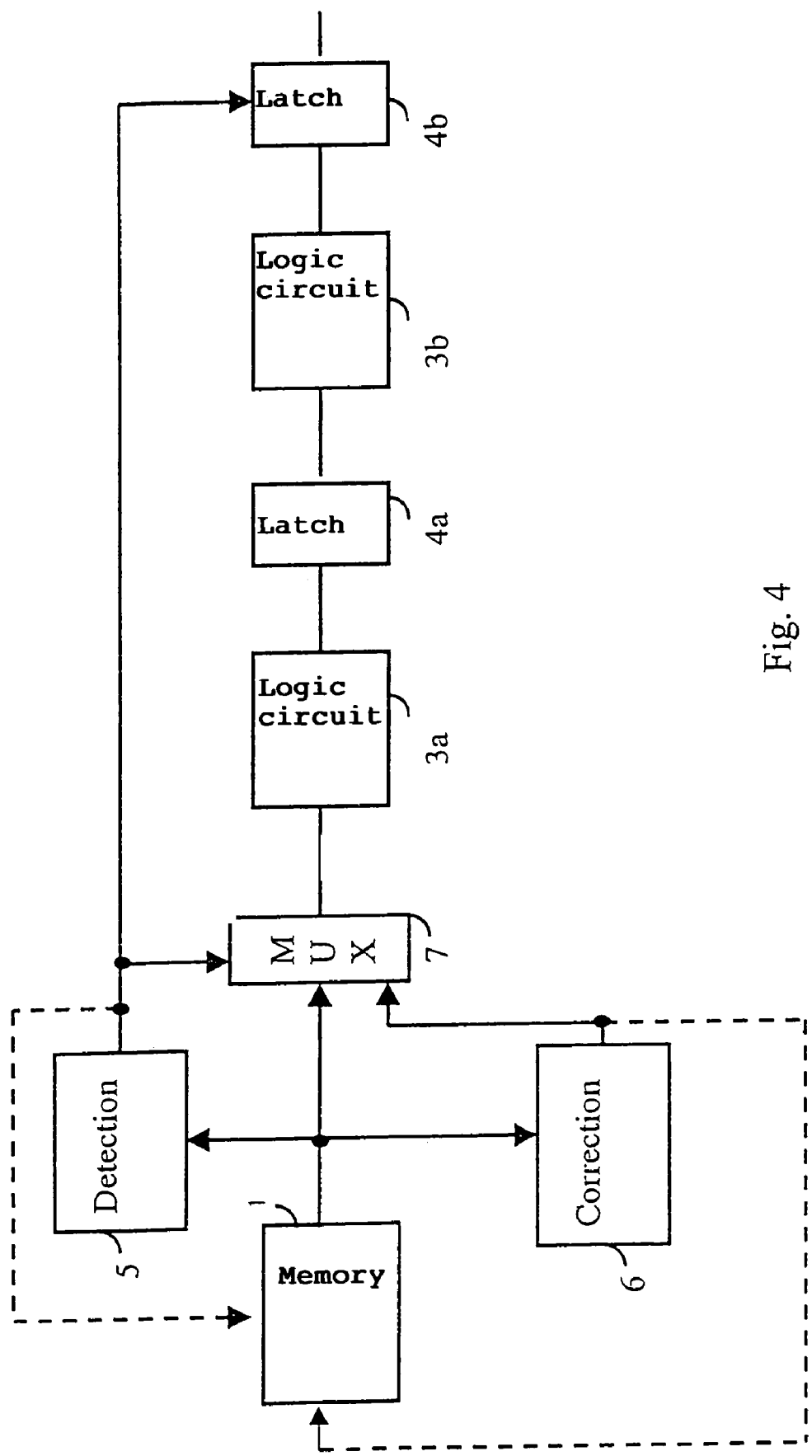
FIG. 4 represents a particular embodiment of the invention for a circuits assembly of the type represented in FIG. 3.

A particular embodiment of the invention in a set of this type is represented in FIG. 4. The output of memory 1 is connected in parallel to an input of an error detection circuit 5, to the input of an error correction circuit 6, and to a first input of a first multiplexing circuit 7. A second input of first multiplexing circuit 7 is connected to the output of correction circuit 6 whereas its output is connected to the input of the first stage, i.e. to the input of logic circuit 3a. The output of detection circuit 5 is connected to a control input of the first multiplexing circuit 7 and to a hold input of each of the latches (4b . . . ) of the successor stages, i.e. the stages of order higher than 1.

Figure 5:
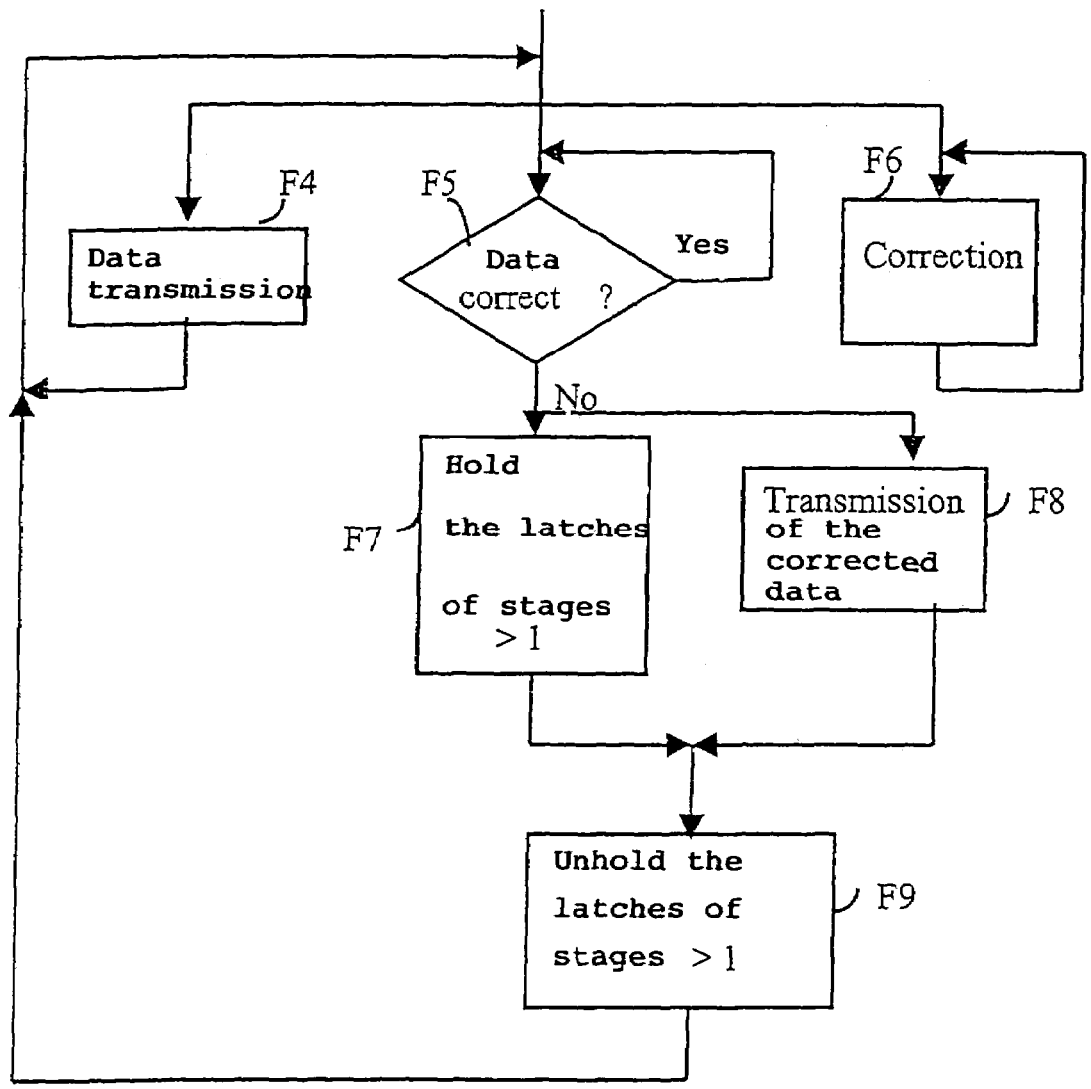
FIG. 5 represents a flowchart illustrating operation of a circuits assembly according to FIG. 4.

In normal operation as represented in the flowchart in FIG. 5, first multiplexing circuit 7 sends (step F4) the data read in memory 1 to first stage logic circuit 3a. At the same time, detection circuit 5 examines the data to detect a possible error (step F5) and the correction circuit performs correction of the data (step F6). If the data are correct (Yes output of F5), the corrected data are not used and the operating cycle continues with transmission and analysis of the next data (back to the input of steps F4, F5 and F6).

If on the other hand an error is detected by detection circuit 5 (No output of F5), the latter then holds (step F7) the latches (4b . . . ) of the stages of order higher than 1 and (step F8) orders transmission of the corrected data to logic circuit 3a. Transmission of the corrected data is performed by means of first multiplexing circuit 7 which then receives on its control input a signal causing transmission of the signals applied to its second input by error correction circuit 6. If necessary, transmission of the corrected data by the multiplexer takes account of the fact that the error correction time may be greater than the error detection time of error detection circuit 5. If the error correction circuit is too slow to supply the corrected data after one clock cycle, the latches must be held during the necessary time. When the corrected data have been sent to the first stage latch 4a, the whole of the system contains correct data and the latches of the stages of any order higher than 1 are then unheld (enabled, i.e. the hold signal is disabled) (step F9) before a new operating cycle is started beginning by transmission and analysis of the next data (back to the input of steps F4, F5 and F6).

Operation of the set according to FIG. 4 is based on the assumption that when detection circuit 5 detects an error and holds the subsequent stages, only the first stage has been contaminated, the data then in the successor stages corresponding to correct data.

Figure 6:
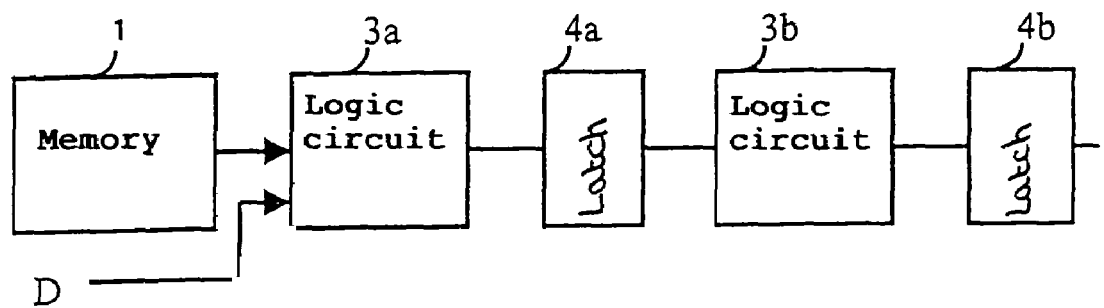
FIG. 6 illustrates a second type of circuits assembly in which the invention can be used.

FIG. 6 schematically illustrates a second type of assembly in which the invention can be implemented. This assembly differs from the assembly of FIG. 3 by the fact that the first stage logic circuit 3a comprises a second input designed to receive additional data D and supplies on output data that are simultaneously a function of the data applied to its first and second inputs, i.e. of the data supplied by memory 1 and of the additional data D.

Figure 7:
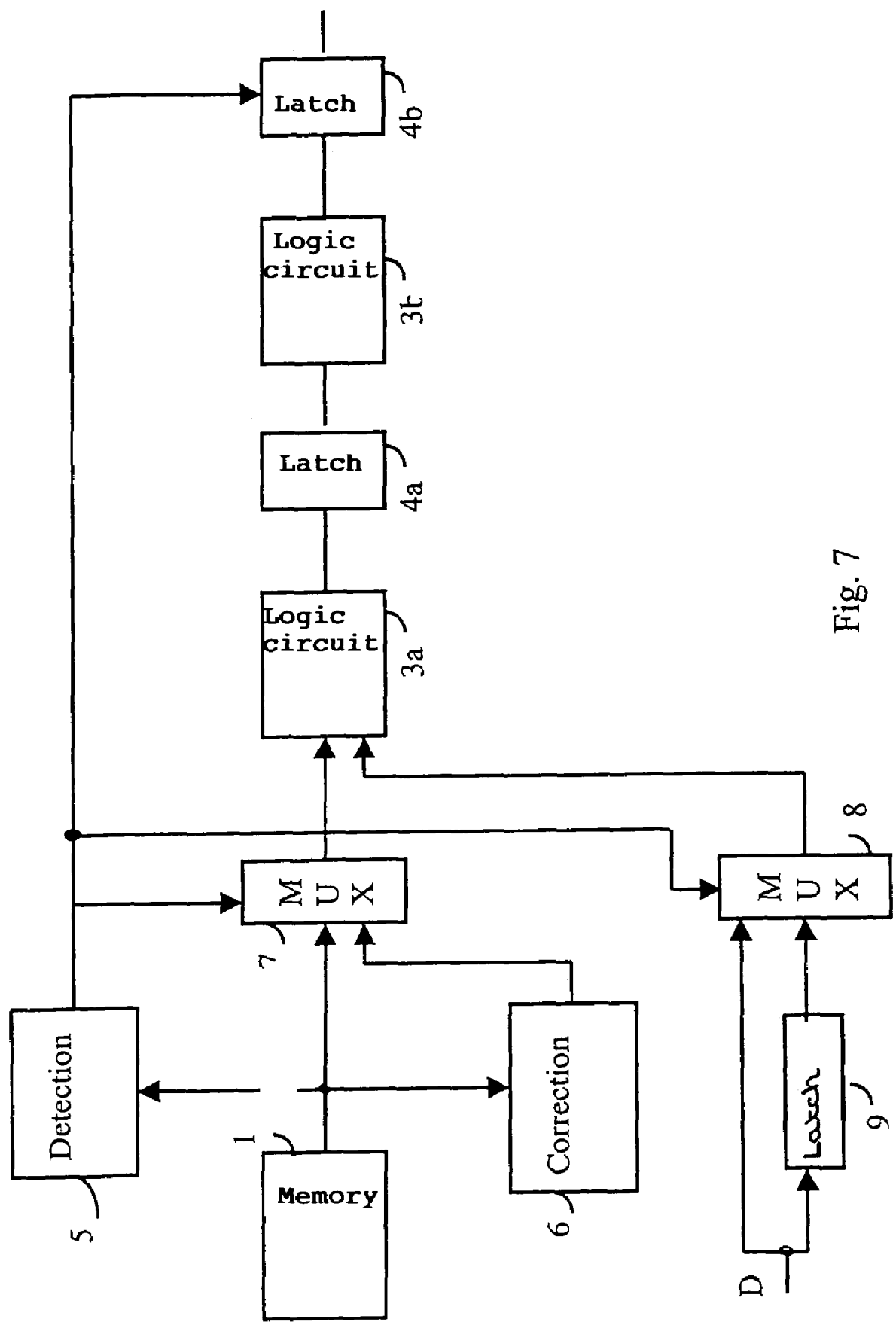
FIG. 7 represents a particular embodiment of the invention for a circuits assembly of the type represented in FIG. 6.

A particular embodiment of the invention in an assembly of this type is represented in FIG. 7. It comprises the same elements as FIG. 4. However, the combination of the additional data D and of the data coming from memory 1 in logic circuit 3a makes it necessary to restore the data present on the two inputs of logic circuit 3a when an error has been detected by error detection circuit 5 in the data from the memory. The assembly of FIG. 7 thus further comprises a second multiplexing circuit 8 which comprises a first input designed to receive the additional data D and a second input connected to the first input by means of an additional latch 9. The additional data D are thus applied, after a preset time delay, to the second input of second multiplexing circuit 8. The second input of logic circuit 3a is connected to the output of second multiplexing circuit 8. The latter comprises a control input connected to the output of detection circuit 5, in the same way as first multiplexing circuit 7.

In normal operation, the additional data D applied to the first input of second multiplexing circuit 8 are transmitted by the latter to the second input of logic circuit 3a. If an error in the data from the memory is detected by the detection circuit, detection circuit 5 causes, as in the assembly according to FIG. 4, holding of the latches (4b ... ) of order higher than 1 and transmission of the corrected data applied to the second input of first multiplexing circuit 7 by error correction circuit 6. At the same time, it also causes transmission of the delayed additional signals applied to the second input of the second multiplexing circuit by additional latch 9. First stage logic circuit 3a thus simultaneously receives the data, from the memory, corrected by correction circuit 6, and the associated delayed additional data. The corrected data supplied by logic circuit 3a are then stored in latch 4a and the latches of the stages of order higher than 1 can be unheld to resume a new operating cycle.

Figure 8:
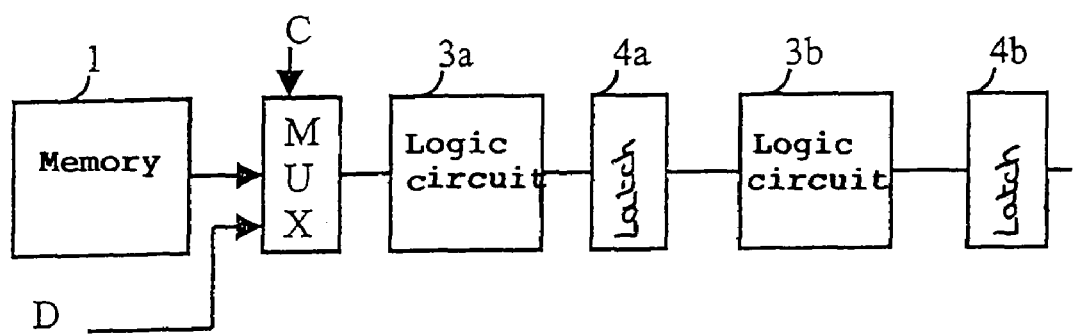
FIG. 8 illustrates a third type of circuits assembly in which the invention can be used.

FIG. 8 schematically illustrates a third type of assembly in which the invention can be implemented. This assembly differs from the assembly of FIG. 6 by the fact that the data from memory 1 and the additional data D are applied successively to the input of the first stage logic circuit 3a by means of a multiplexing circuit 10, under the control of a first control signal C applied to a first control input of multiplexing circuit 10. The data transmitted by logic circuit 3a to latch 4a are a preset function of the data successively applied to its input by multiplexing circuit 10.

Figure 9:
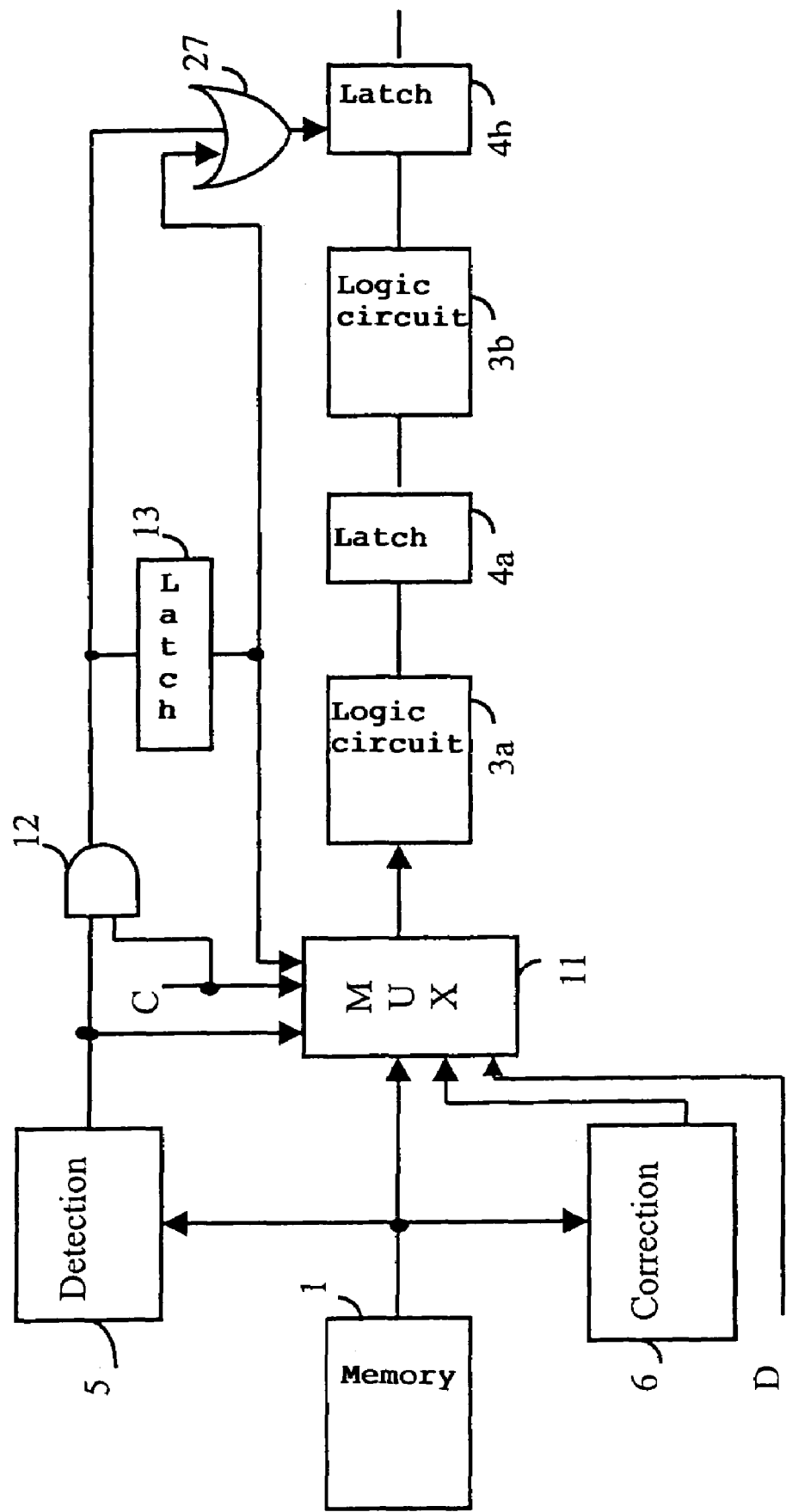
FIG. 9 represents a particular embodiment of the invention for a circuits assembly of the type represented in FIG. 8.

A particular embodiment of the invention in an assembly of this type is represented in FIG. 9. It comprises the same elements as FIG. 4. However, first multiplexing circuit 7 of FIG. 4 is replaced by a multiplexing circuit 11 which comprises a third input to which the additional data D are applied, and three control inputs. A first control input receives the first control signal C, whereas a second control input is connected directly to the output of error detection circuit 5 which supplies a second control signal thereto. The hold input of the latches (4b ... ) of the stages of order higher than 1 and the third control input of multiplexing circuit 11 are connected to the output of a logic gate 12, of AND type in the embodiment represented, having a first input connected to the output of detection circuit 5 and a second input receiving the first control signal C. The output of logic gate 12 supplies a third control signal to the third control input of multiplexing circuit 11.

In an alternative embodiment represented in FIG. 9, an additional latch 13, connected between the output of logic gate 12 and the third control input of multiplexing circuit 11, supplies a third control signal to the latter. In this case, a logic gate 27, of OR type in the embodiment represented, comprises an input connected to the output of logic gate 12 and an input connected to the output of latch 13. The hold input of the latches (4b ... ) of the stages of order higher than 1 is then connected to the output of logic gate 27.

In normal operation, multiplexing circuit 11 transmits the additional data D applied to its third input to logic circuit 3a when the first control signal C has a first preset value (0 in the example represented) and transmits the data, read in the memory, applied to its first input, to logic circuit 3a when the first control signal C takes a second preset value (1 in the example represented). The second control signal, of value 0, representative of correct read data, also forces the output of logic gate 12 to 0.

If an error in the data from the memory is detected by the detection circuit, detection circuit 5 supplies a second control signal, of value 1, representative of an error in the read data. If an error is detected while the data transmitted by multiplexing circuit 11 are the data read in the memory (C=1), the first stage has been contaminated and a correction must be made. If on the other hand the error is detected while the data transmitted by multiplexing circuit 11 are the additional data D (C=0), the first stage has not been contaminated and no correction is required. In this case, the output signal of logic gate 12 remains at 0 since at least one of its inputs (C) remains at 0. The latches (4b ... ) of the stages of order higher than 1 are therefore not held. If on the other hand, the two inputs of logic gate 12 go to 1 at the same time (C=1 and error detected), then the logic gate output signal goes to 1 and causes hold in their present state of the latches of the subsequent stages and transmission of the corrected data to logic circuit 3a.

In the case where the correction circuit requires an additional cycle to supply the corrected data, latch 13 and gate 27 are provided. In this case, at the next clock cycle, i.e. after a delay enabling the correction circuit to complete correction, additional latch 13 supplies a third control signal of value 1 to multiplexing circuit 11 causing transmission to logic circuit 3a of the corrected data applied to its second input. Transmission of the corrected data and holding of the latches of the subsequent stages until correction has been completed in the first stage are thus only performed when an error has been detected by detection circuit 5 during transmission by multiplexing circuit 11 of data from memory 1.

If the correction circuit takes more than one clock cycle, the latches (4b ... ) of the stages of order higher than 1 will be held for a longer time and several latches 13 will be used to delay the output of logic gate 12 for the necessary time.

In the case (not represented) where several additional data Di (D1, D2 ..., Dr) have to be applied to logic circuit 3a, these data are applied to the input of multiplexer 11. In this case the control signal is adapted accordingly and can take various values Ci each corresponding to transmission of one of the additional data Di.

To prevent a detected error from being reproduced systematically at each new reading of the corresponding data, this data can be replaced in the memory by the corrected data. This possibility is shown schematically in broken lines in FIG. 4. In this case, the output of the correction circuit 6 is connected to the input of the memory and a memory writing control input is connected to the output of detection circuit 5 so as to cause writing in the memory of the corrected data after an error has been detected. As the data has been corrected in the memory at the first detection of an error, this will enable the time required for its correction, at a subsequent reading in the successor stages, to be saved. Furthermore, if the error is not corrected in the memory, the risk of combination with an additional error occurring subsequently, that is able to exceed the correction capacities of the correction circuit, cannot be excluded.

In certain assemblies, several stages may have been contaminated before detection of the error and hold of the latches of the stages not liable to have been contaminated by detection circuit 5. In this case, it is necessary to determine beforehand which are the latches of the assembly liable to be contaminated by an error before the latter is detected and to adapt the decontamination means accordingly.

In the assumption that the error is propagated over the assembly during k clock cycles before it is detected and the latches are held, with k>1, all the latches that are successors of the memory at a distance smaller than or equal to k are liable to have been contaminated. For a given assembly, the number k, dependent on the speed of the detection circuit and on the duration of a clock cycle, is known. The distance d between any couple of components is defined by the number of clock cycles necessary for the output data of a component of the couple to be taken into account directly or indirectly by the other component. In certain cases, there may be several paths of different lengths between the two components of a couple. The minimum distance between the two components of a couple will then be designated by dmin and the maximum distance by dmax.

More precisely, if the signals propagate from a latch B1 to a latch B2 via a number r of latches, B1 will be considered as a predecessor of B2, and B2 as a successor of B1. The distance d(B1-B2), in the propagation path considered, between predecessor B1 and successor B2 is then equal to r+1. If there are several propagation paths starting from B1 and reaching B2, the minimum of all the distances of the different paths is represented by dmin(B1-B2) and their maximum is represented by dmax(B1-B2). B1 is considered as the immediate predecessor of B2 when dmin(B1-B2)=1. In this case, B2 is an immediate successor of B1.

Figure 10:
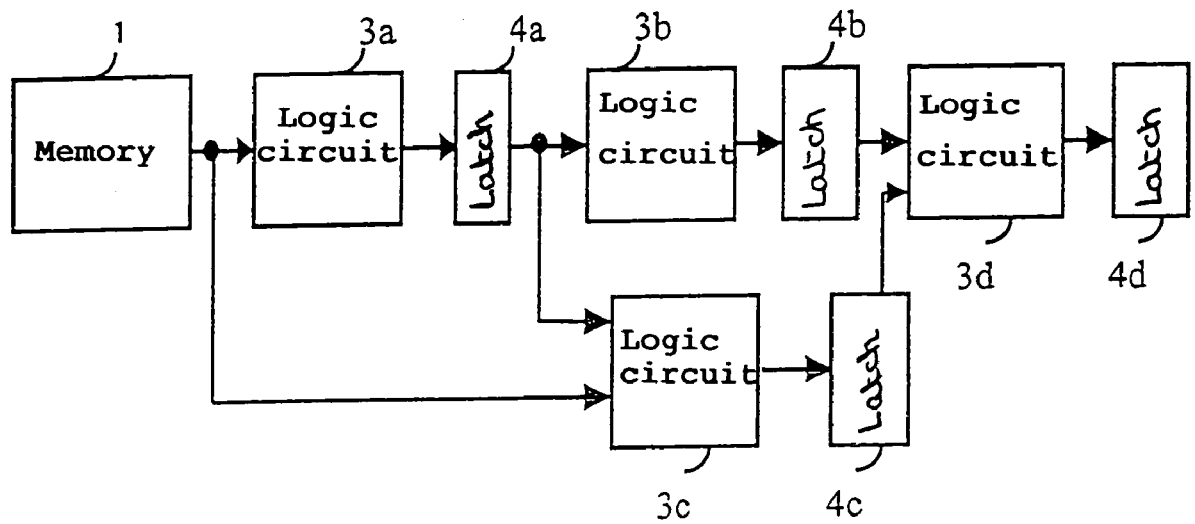
FIGS. 10 and 11 represent assemblies comprising multiple paths between certain components.

For example purposes, in the assembly according to FIG. 3, memory 1 and latch 4a are separated by a distance d=1, whereas memory 1 and latch 4b are separated by a distance d=2. The assembly according to FIG. 10 comprises multiple paths between certain components. A logic circuit 3c whose output is connected to the input of a latch 4c in fact comprises two inputs respectively connected to the output of memory 1 and to the output of latch 4a. A logic circuit 3d whose output is connected to the input of a latch 4d also comprises two inputs respectively connected to the output of latch 4b and to the output of latch 4c. In such an assembly, between memory 1 and latch 4d, the set of distances is given by {2, 3}, with dmin=2 and dmax=3. The distance between memory 1 and latch 4d can in fact take two values:

the value 2 if we consider a path successively comprising memory 1, logic circuit 3d, latch 4c, logic circuit 3d and latch 4d, the value 3 if we consider a path successively comprising memory 1, logic circuit 3a, latch 4a, logic circuit 3b, latch 4b, logic circuit 3d and latch 4d, or a path successively comprising memory 1, logic circuit 3a, latch 4a, logic circuit 3c, latch 4c, logic circuit 3d and latch 4d.

Figure 11:
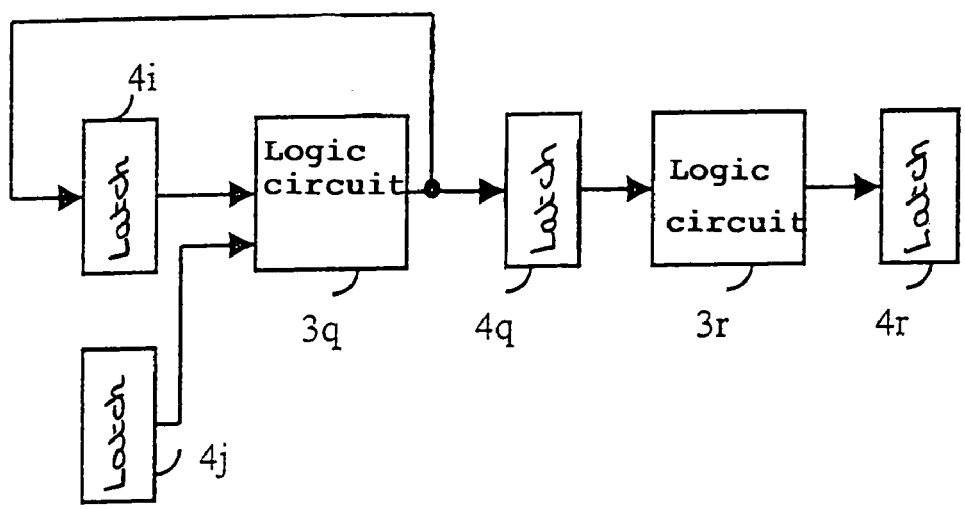

A part of a multiple-path set comprising a loop is represented in FIG. 11. A logic circuit 3q, whose output is connected to the inputs of a latch 4q and of a latch 4i, comprises two inputs respectively connected to the output of latch 4i and to the output of a latch 4j. The output of latch 4q is connected to the input of a logic circuit 3r whose output is connected to the input of a latch 4r. In such an assembly, there are an infinity of distances between two components. The distance between latch 4j and latch 4i can in fact take an infinity of values greater than or equal to 1:

the value 1 for the path successively comprising latch 4j, logic circuit 3q and latch 4i, the value 2 for the path successively comprising latch 4j, logic circuit 3q, latch 4i and again logic circuit 3q and latch 4i, the value 3 for the path successively comprising latch 4j, logic circuit 3q, latch 4i, logic circuit 3q and latch 4i, and again logic circuit 3q and latch 4i, etc . . .

Likewise the distance between latch 4i and itself can take the value 0, the value 1 (path 4i, 3q, 4i), the value 2 (path 4i, 3q, 4i, 3q, 4i), the value 3 (path 4i, 3q, 4i, 3q, 4i, 3q, 4i), or any greater value.

The distance between latch 4i and latch 4r can take any value greater than or equal to 2 (path 4i, 3q, 4q, 3r, 4r; path 4i, 3q, 4i, 3q, 4q, 3r, 4r; path 4i, 3q, 4i, 3q, 4i,3q, 4q, 3r, 4r; etc . . . ).

When the distance can take an infinity of values, the maximum distance dmax is limited to the value k. We thus obtain, for the example of FIG. 11:

between latch 4j and latch 4i: dmin=1 and dmax=k, between latch 4i and itself: dmin=10 and dmax=k, between latch 4i and latch 4r: dmin=2 and dmax=k.

In the description that follows, the following shall be designated by:

A or attainable set, the set of latches Ba liable to be attained by an error coming from memory 1, i.e. whose minimum distance with respect to the memory is less than or equal to k (dmin≦k).

A1 or non attainable set, the set of latches not liable to be attained within k clock cycles by an error from memory 1, i.e. whose minimum distance with respect to the memory is greater than k (dmin>k) or which are not successors of memory 1.

Amax or furthest attainable set, the set of latches for which dmin=k and of the latches for which dmin<k, but which do not have any successors.

S or external source set, the set of latches Bs belonging to set A1 or to set Amax that are predecessors of a latch Ba of set A from which they are separated by a distance dmin≦k.

S1 or sufficient source set, the set of latches of set S that are sufficient to perform correction of the data in the circuits assembly. There are several sufficient source sets.

S2 or immediate source set, the set of latches of set S that are immediate predecessors of a latch Ba of set A, i.e. separated from the latter by a distance dmin=1. S2 is a particular sufficient source set S1.

Apl the set of latches Bapl, of set A, excluding Amax, having several inputs connected to different latches Bapl-1, constituting immediate predecessors and themselves separated from memory 1 by different dmin (memory–Bapl-1 latch) distances.

AS or attainable source set, the set of latches Bapl-1 of set A, excluding Amax, predecessors of a latch Bapl and whose distance dmin (memory–Bapl-1 latch) to the memory is greater than the minimum value of the dmin (memory–Bapl-1 latch) distances associated to the corresponding Bapl latch.

Figure 12:
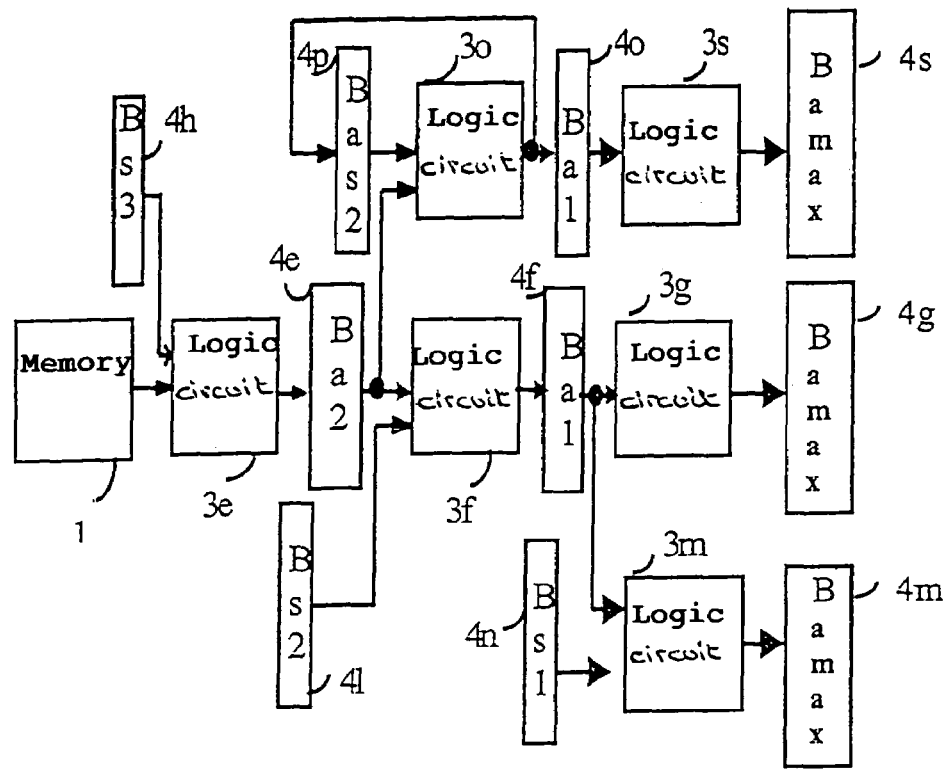
FIG. 12 illustrates a multiple-path circuits assembly in which the invention can be used.

For example purposes, how the elements belong to these different sets of the circuits assembly of FIG. 12 will be described below. In FIG. 12, memory 1 is serially connected to a logic circuit 3e, a latch 4e, a logic circuit 3f, a latch 4f, a logic circuit 3g and a latch 4g. Logic circuit 3e comprises an additional input connected to the output of a latch 4h and logic circuit 3f comprises an additional input connected to the output of a latch 4l. The output of latch 4f is also connected to a first input of a logic circuit 3m having a second input connected to the output of a latch 4n and an output connected to the input of a latch 4m. The output of latch 4e is also connected to a first input of a logic circuit 3o having a second input connected to the output of a latch 4p and an output connected both to the input of a latch 4o and to the input of latch 4p. The output of latch 4o is serially connected with a logic circuit 3s and a latch 4s.

Figure 13:
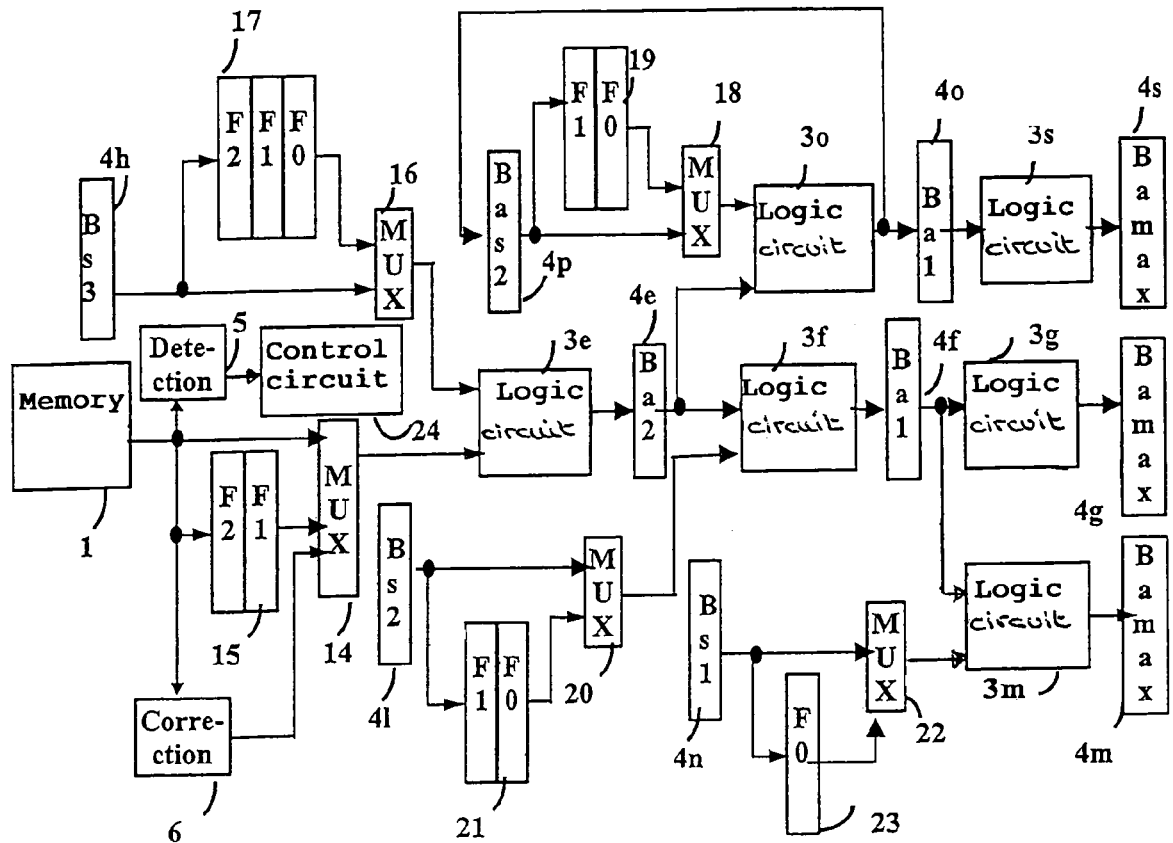
FIG. 13 represents a particular embodiment of the invention for a circuits assembly of the type represented in FIG. 12.

The number k being assumed to be equal to 3, latches 4e, 4f, 4g, 4m, 4o, 4p and 4s belong to set A, whereas latches 4h, 4l and 4n belong to source set S and more particularly to set S2. Latches 4m, 4g and 4s belong both to set Apl and to set Amax and latch 4p to set AS. In FIGS. 12 and 13 the latches are identified by Ba, Bamax, Bas or Bs depending on whether they belong to set A only, to set Amax, to set As or to set S. They are in addition, except for the latches of set Amax, identified by a number representative of the minimum distance $(dmin)_{min}$ separating them from the associated latches Bamax of subset Amax. Thus latches 4o and 4f are identified by Ba1, latch 4e by Ba2, latch 4p by Bas2, latch 4n by Bs1, latch 4l by Bs2 and latch 4h by Bs3. By generalising this notation, each latch is identified by Bxy, x being representative of the set to which the latch belongs (x=a, amx, as or s) and y being representative of the minimum distance separating the latch from the associated latches of set Amax.

FIG. 13 completes the circuits assembly of FIG. 12 with the elements enabling correction to be performed in 3 clock cycles.

A multiplexing circuit 14 comprises a first input connected to the output of memory 1, a second input connected to the output of correction circuit 6, and an output connected to the input of logic circuit 3e initially connected to the memory. It also comprises a third input connected to the output of the memory by means of a buffer register 15 with two cells of the first in, first out type, designated by the usual abbreviation FIFO. Such a register introduces a delay dependent on the number of cells F that constitute it and stores the last two values presented on its input.

The output of latch 4h is connected directly to a first input of a multiplexing circuit 16 and, via a 3-stage FIFO register 17, to a second input of multiplexing circuit 16, the output whereof is connected to the additional input of logic circuit 3e. In similar manner, the output of latch 4p is connected directly to a first input of a multiplexing circuit 18 and, via a 2-stage FIFO register 19, to a second input of multiplexing circuit 18, the output whereof is connected to the second input of logic circuit 3o. The output of latch 4l is connected directly to a first input of a multiplexing circuit 20 and, via a 2-stage FIFO register 21, to a second input of multiplexing circuit 20, the output whereof is connected to the additional input of logic circuit 3f. The output of latch 4n is connected directly to a first input of a multiplexing circuit 22 and, via a single-stage FIFO register 23, to a second input of multiplexing circuit 22, the output whereof is connected to the second input of logic circuit 3m. The number of cells of a FIFO register is smaller than or equal to k, i.e. to 3 in the particular embodiment represented. The cells of each FIFO register are designated by F0, F1, F2 ... Fk-1, starting with the register output cell.

When it has detected an error on output from memory 1, detection circuit 5 controls the multiplexers and FIFO registers, as well as holding and unholding of the latches, by means of a control circuit 24, so as to correct all the data liable to have been affected by the error.

Figure 14:
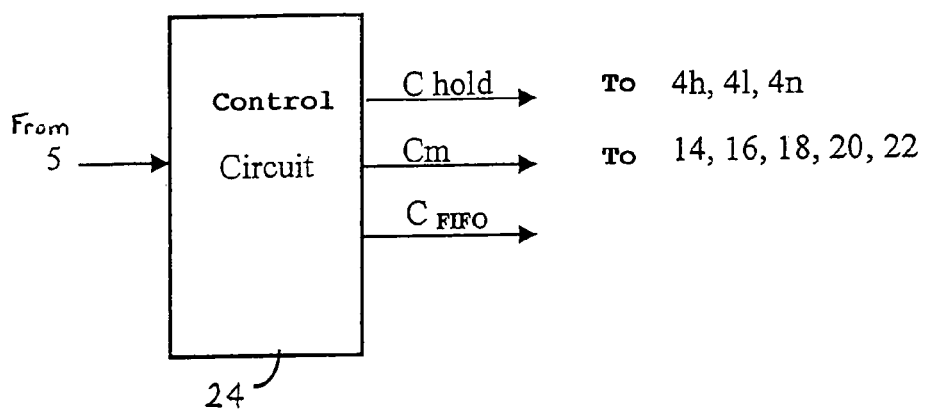
FIG. 14 illustrates in greater detail the output signals of the control circuit of the circuits assembly according to FIG. 13.

The output signals from control circuit 24 are illustrated in greater detail in FIG. 14:

Chold signals are applied to all the latches not belonging to the set, i.e. in FIG. 13 to latches 4h, 4l and 4n and to all the latches, not represented, belonging to the set A1.

Cm signals are applied to the multiplexer control inputs.

$C_{FIFO}$ signals are applied to the FIFO register cells.

In the general case, a set S1 to be decontaminated is chosen. A FIFO register and a multiplexer are associated to the output of each latch of the selected set S1, the multiplexer comprising an input connected directly to the output of the latch involved and an input connected to this output via the FIFO register.

We are first going to consider the case where the selected set is set S2, which in general gives the lowest hardware cost.

The number n1 of cells of a FIFO register associated to a latch Bs2 of set S2 that has a single immediate successor Ba belonging to set A is given by:

$$n1 = k + 1 - d\text{min}(\text{memory} - Ba)$$

During the decontamination process, a first read enable cycle of this FIFO register is the cycle corresponding to the value dmin(memory–Ba). The last read enable cycle of this FIFO register is the cycle k of the decontamination process. During all the cycles where the FIFO register is enabled for read, the output data of the FIFO register are transmitted to the output of the associated multiplexer.

In the case where latch Bs2 is the immediate predecessor of several latches of set A, the minimum of all the corresponding dmin(memory–Ba) can be represented by $d\text{min}(\text{memory}-Ba)_{min}$. The size n1 of the FIFO register associated to latch Bs2 is then given by:

$$n1 = k + 1 - d\text{min}(\text{memory} - Ba)_{min}$$

Read enable of this FIFO register then starts at the cycle $d\text{min}(\text{memory}-Ba)_{min}$ and finishes at the cycle k of the decontamination process. As previously, during all the cycles where the FIFO register is enabled for read, the output data from the FIFO register are transmitted to the output of the associated multiplexer.

A FIFO register and a multiplexer are also associated to each latch Bas of set As to supply the data necessary for decontamination. The principle is the same as that used for the latches of set S2. Nevertheless, transmission of the content of this FIFO register has to be interrupted before the end of the decontamination process to avoid supplying contaminated data, as the state of latch Bas belonging to set A is contaminated during normal operation of the system.

In the case where a single latch Bpl is associated to a latch Bas, the size n2 of the FIFO register associated to latch Bas is given by:

$$n2 = k + 1 - d\text{min}(\text{memory} - Bpl)$$

The FIFO register involved is enabled for read from the cycle dmin(memory−Bpl). Alternatively, a FIFO register of size k can be used and enabled as from the first cycle of the decontamination process. In both cases, the last enable cycle of the FIFO register is the cycle dmin(memory−Bas). During these cycles, the output data from the FIFO register are transmitted to the output of the associated multiplexer. After the last read enable cycle of the FIFO register, the output data of latch Bas are transmitted to the output of the associated multiplexer. The FIFO register could be continued to be enabled even after the dmin(memory−Bas) cycle, as its output is no longer transmitted by the multiplexer.

In the case where a latch Bas of set AS is associated to several latches Bpl, the minimum value of the corresponding dmin(memory−Bpl) values will be represented by dmin(memory−Bpl)$_{min}$. The size n2 of the FIFO register will then be given by:

$$n2 = k+1 - dmin(memory-Bpl)_{min}$$

Enabling the FIFO register then starts at the cycle dmin(memory−Bpl)$_{min}$ of the decontamination process and finishes at the cycle dmin(memory−Bas). The associated multiplexer transmits to its output the output of the FIFO register during these cycles and the output of latch Bas after the cycle dmin(memory−Bas). As previously, a FIFO register of size k can also be used and enabled as from the first cycle of the decontamination process.

In the case where the latches of sets S2 and AS are used for decontamination, the duration of the decontamination process is k cycles. The latches of set A1 are then disabled during these k cycles and possibly during the cycles necessary for correction of the data read in the memory by the correction circuit.

For any source set S1 chosen, the size and the enable times of the FIFO register to be associated to each of the latches Bs1 can also be defined in the same way.

A FIFO register and a multiplexer are also associated to the memory. The size of this FIFO register is k−1. In decontamination phase, its first read enable cycle is cycle 2 of the decontamination phase and its last read enable cycle is cycle k of this phase. As represented in FIG. 13, a single multiplexer 14 can be used to select the output of FIFO register 15 associated to memory 1 and to the output of correction circuit 6. In normal operation, multiplexer 14 connects its input connected to the output of memory 1 to its output. During the first cycle of the decontamination phase, it connects its input connected to the output of correction circuit 6 to its output and, during the k−1 cycles following the decontamination phase, it connects its input connected to the output of FIFO register 15 to its output.

This particular embodiment has the drawback of storing in FIFO register 15 an erroneous data which would be read in the memory in the k−1 cycles following reading of the first erroneous data.

Figure 15:
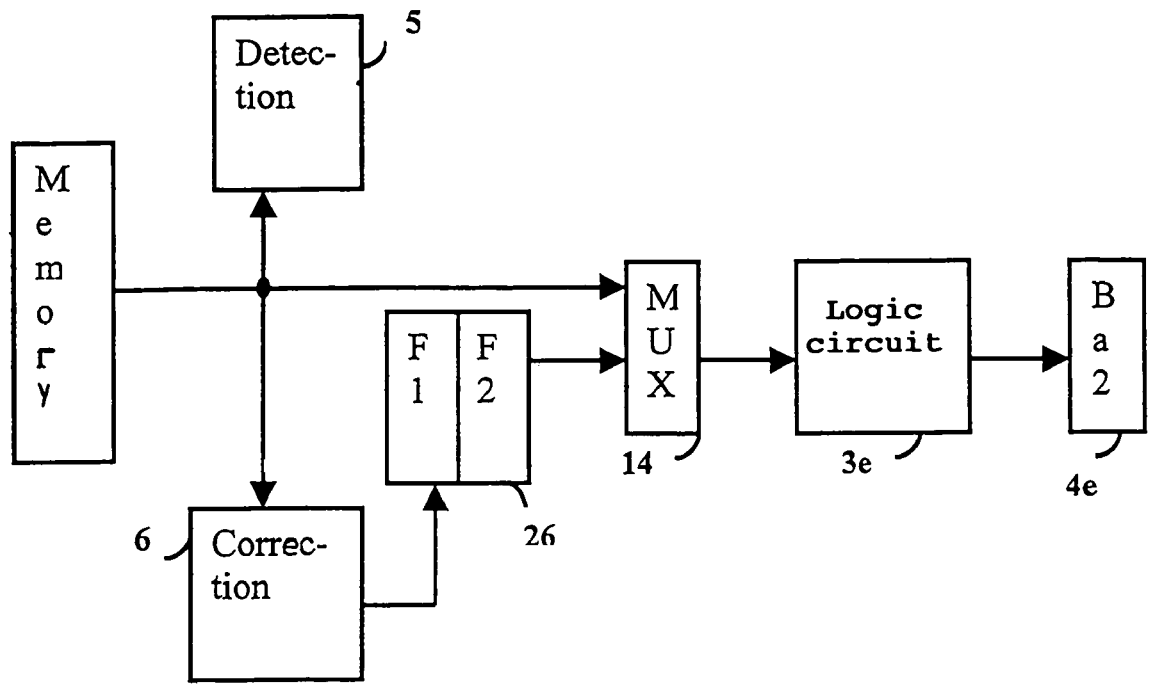
FIGS. 15 and 16 represent two alternative embodiments of connection of the circuits associated to the memory of the assembly according to FIG. 13.

FIG. 15 illustrates an alternative embodiment enabling this problem to be overcome. FIFO register 15 of FIG. 13 is replaced by a FIFO register 26 whose input is connected to the output of correction circuit 6. Correction circuit 6 supplies both the corrected erroneous data and the unchanged correct data coming from the memory. The time required to pass through the correction circuit is identical for all the data, corrected erroneous or correct, coming from memory 1. If this time exceeds one clock cycle, the correction circuit will then be designed so as to supply on its output one data per clock cycle, each of these data being delayed by a number x of clock cycles corresponding to the time required to pass through the correction circuit. Thus, if a correct or erroneous data is read in the memory at a cycle t0, this data, corrected if required, is stored in FIFO register 26 at the cycle t0+x. A correct or erroneous data read in the memory at a cycle t0+y is stored in the FIFO register at the cycle t0+x+y. All the data stored in the FIFO register are then correct.

Consequently, if an erroneous data is read in memory 1 at the cycle t0, the k data used during the decontamination phase are stored in the FIFO register at the cycle t0+x+k−1. It is then at the cycle t0+x+k that the decontamination phase will begin. The necessary data from the memory are then all in FIFO register 26 and they are all correct. FIFO register 26 is enabled for read during the k cycles of the decontamination phase. During these cycles, multiplexer 14 connects its input connected to the output of FIFO register 26 to its output. In normal operation, multiplexer 14 connects its input connected to the output of memory 1 to its output.

Alternatively, it is possible to reduce the size of the FIFO register to k−x and to begin the decontamination phase at the cycle t0+k, assuming that k≧x. If the correction circuit is slow, then k is smaller than x and the size of the FIFO register becomes nil. The decontamination phase then begins at the cycle x.

Figure 16:
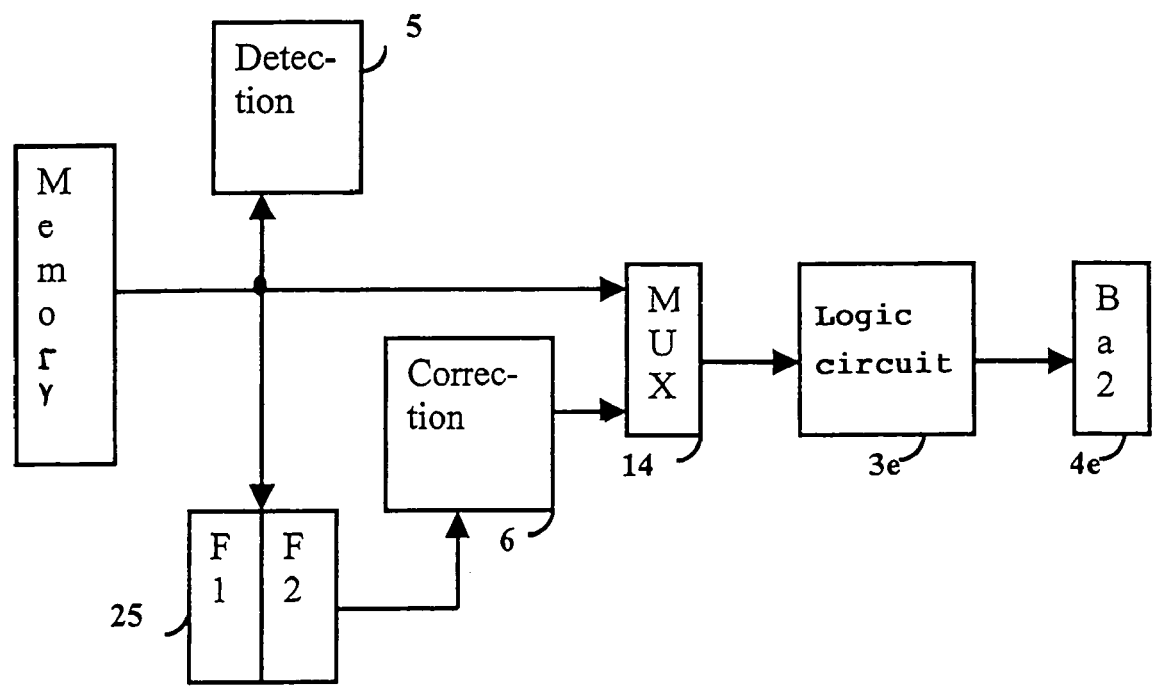

FIG. 16 illustrates another alternative embodiment. A FIFO register 25 is then connected between the output of memory 1 and the input of correction circuit 6. Thus, in normal operation, the correct or erroneous data are stored in FIFO register 25 as and when they are read in the memory. When detection circuit 5 indicates an error, the k data necessary for decontamination are stored in FIFO register 25. Some of these data may be erroneous. From this time, read enable of FIFO register 25 is started. Correction circuit 6 supplies the first data, which is always correct, x cycles later. The decontamination phase, lasting k cycles, then begins, the multiplexer selecting its input connected to the output of the correction circuit which supplies a data, corrected if necessary, during each cycle. Alternatively, the size of the register can be reduced to k−x and the decontamination phase be started at the cycle t0+k, assuming that k≧x. If the correction circuit is slow, then k is smaller than x and the size of the FIFO register becomes nil. The decontamination phase then begins at the cycle x.

The control code associated to the data supplied by memory 1 and enabling detection and if necessary correction of an error on output from memory 1 is computed and stored during a data write phase in the memory. This computation introduces an additional delay which may have an impact on the operating cycle of the assembly. This impact can be eliminated by using the techniques described below.

Figure 17:
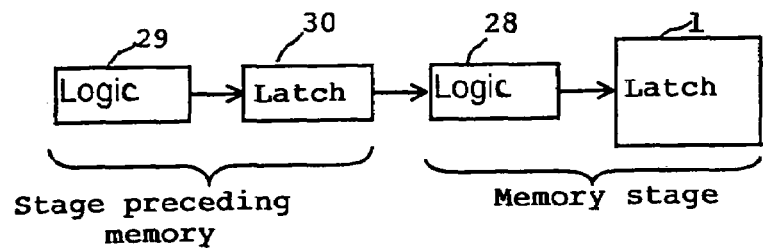
FIG. 17 illustrates an assembly comprising a stage located upstream from the memory.

As represented in FIG. 17 a memory stage, which may comprise a logic circuit 28 preceding memory 1, is connected to a predecessor stage supplying data thereto. The latter conventionally comprises at least one logic circuit 29 whose output is connected to the input of a latch 30 (or a latch stage) itself connected to the input of logic circuit 28 of the memory stage.

Various solutions can be used during a data write phase in memory 1, depending on the constraints as far as delay are concerned.

If the sum of the memory stage delay Dm and of the code generation stage delay Dg is smaller than the clock period Dh of the assembly, the code generation circuit can be inserted in the memory stage without reducing the operating speed of the assembly.

If the sum of the delay Dp of the stage preceding memory 1, of the memory stage delay Dm and of the code generation stage delay Dg is smaller than two clock periods Dh of the assembly, we can consider on the one hand the case where the memory stage does not include a logic circuit 28 and on the other hand the case where the memory stage does include a logic circuit 28.

In the first case (no logic circuit 28), the code generation circuit is divided into two parts, a first part having a first delay D1 and a second part having a second delay D2, such that $D1+Dp \leq Dh$ and $D2+Dm \leq Dh$. The first part of the code generation circuit is then inserted in the stage preceding the memory and the second part of the code generation circuit is inserted in the memory stage.

In the second case (logic circuit 28 present), it is the block formed by concatenation of the memory stage logic circuit 28 and of the code generation circuit that is divided into two parts, a first part having a first delay D'1 and a second part having a second delay D'2, such that $D'1+Dp \leq Dh$ and $D'2+Dm \leq Dh$. The first part of the block is then inserted in the stage preceding the memory and the second part of the block is inserted in the memory stage.

These solutions do not however always enable the system to operate at full speed. In this case, the performances of the system can be improved by using the dissymmetries of the delays of the paths taken respectively by the data and by the code during the memory read and write phases.

During a write phase, the data can in fact be written in memory 1 immediately, but the code has to be generated before being written in memory. There is therefore an additional delay for writing the code corresponding at most to the delay Dg of the code generation circuit. This delay will be less than Dg if Dm is smaller than Dh. In this case, an additional delay equal to Dg+Dm−Dh is obtained. In a similar way, during a memory read phase, the data are read and a code is generated from the read data then compared bit by bit in an exclusive OR logic circuit with the code previously stored in the memory so as to generate a syndrome. An additional delay corresponding to the delay Dg of the code generation circuit therefore exists in the path taken by the read data. As the delays Dg of the two code generation circuits (on write and read) are identical, the additional delay introduced in the path taken by the code on write is smaller than or equal to the delay introduced in the path taken by the data on read.

Figure 18:
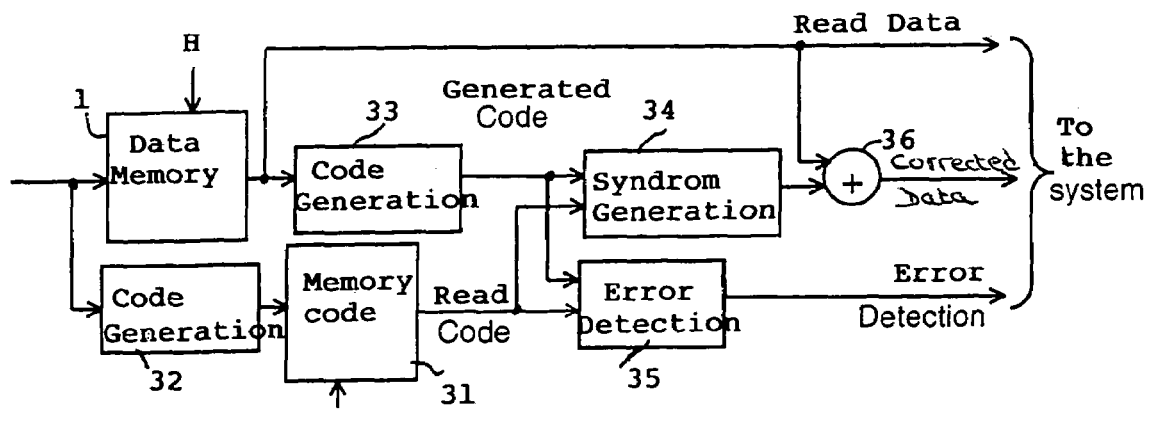
FIG. 18 illustrates means enabling operation of an assembly according to FIG. 17 to be speeded up when writing in the memory is performed.

These features are used in the embodiment illustrated in FIG. 18 to eliminate any delay in writing the data in the memory. For this, the code corresponding to the data written in the memory is not stored in memory 1 (or data memory) but in a distinct memory, code memory 31.

As represented in FIG. 18, the data to be written in memory 1 are applied in parallel to an input of memory 1 and to the input of a first code generation circuit 32, the output whereof is connected to the input of code memory 31. The output of memory 1 is connected on the one hand directly to the successor blocks of the system so as to supply the "read data" thereto and on the other hand to the input of a second code generation circuit 33. The output of the second code generation circuit 33, supplying a "generated code" in memory read phase, is connected to a first input of a syndrome generation circuit 34 and to a first input of an error detection circuit 35 supplying an error detection signal to the system. The output of code memory 31 supplying a "read code" is connected to a second input of syndrome generation circuit 34 and to a second input of error detection circuit 35. The output of syndrome generation circuit 34 is connected to an input of an exclusive OR logic circuit 36 comprising another input connected directly to the output of memory 1 and supplying the "corrected data" to the system on output. The code generation circuit 33, syndrome generation circuit 34 and logic circuit 36 make up the correction circuit 6 (FIGS. 4, 7, 9, 13, 15 and 16).

In the embodiment represented in FIG. 18, a clock signal H being applied to a clock input of memory 1, a clock signal H+Dc, i.e. with a delay Dc with respect to the clock signal H, is applied to a clock input of code memory 31. We will choose $Dc \geq Dg+Dm-Dh$, but smaller than Dg so as not to introduce in the path taken by the code on write, any delay greater than the additional delay of the path taken by the code on read.

Thus, during a write cycle, the data are written immediately in memory 1 at a time t0. The data are held by a latch on the inputs of first code generation circuit 32. When the code is ready, at the latest at a time t0+Dg, it is written in code memory 31.

During the read cycle, the data read at a time t1 can be sent directly to the next blocks of the system as described above, the successor stages being subsequently decontaminated in case of propagation of an error. The "read data" are simultaneously applied to the input of the second code generation circuit 33 which generates the "generated code" at a time t1+Dg. The "read code" is ready at the latest when the "generated code" is ready and the two codes can be used immediately by error detection circuit 35 and syndrome generation circuit 34 so as to detect a possible error and/or generate a syndrome.

The times t0 and t1 may be identical to the write and read times t0 and t1 of a memory 1 not using error control codes. The embodiment of FIG. 18 does not in fact, for most of the clock cycles, add any delay due to code generation, error detection and error correction, the data being written without delay in memory 1 and the data read in memory 1 being supplied immediately to the rest of the system. Wait cycles are only introduced into the system after the rare cycles during which erroneous data are read in memory 1.

The write and read operations of code memory 31 are performed with the same delay Dc with respect to the write and read operations of data memory 1. The write and read cycles of code memory 31 thus have the same duration as the write and read cycles of data memory 1. In the particular embodiment of FIG. 18, memories 1 and 31 are synchronous memories controlled by clock signals staggered by Dc, which enables the clock signals of code memory 31 to be derived from the clock signals H of memory 1.

In an alternative embodiment, the same clock signals H can be used for memories 1 and 31, to simplify the circuit, and the write and read operations of code memory 31 can be performed one cycle after the corresponding operations of data memory 1.

However, code memory 31 is smaller than data memory 1 so that code memory 31 can be faster than data memory 1. It is therefore not indispensable to introduce a delay equal to t1−t0 between the code memory read and write operations. The write operation in code memory 31 is thus performed at the time t0+Dc, i.e. with a delay of Dc with respect to the write operation in data memory 1. As the code memory is on the other hand faster, the read operation of code memory 31 does not need to be performed at the time t1+Dc, i.e. it does not need to be delayed by Dc with respect to the read operation of data memory 1. For example, if code memory 31 is sufficiently faster than data memory 1, the code memory read operation can be performed at the same time as the data memory read operation.

In the above description, it has been assumed that Dc was smaller than a clock period Dh. However, in certain cases, when the system is very fast and/or the codes very complex, Dc may be greater than Dh. To avoid having to reduce the speed of the system, pipeline type code generation circuits can then be used. In this case, code generation takes a number r of clock cycles greater than 1, whether for write or read. In this case, each code memory operation is performed r cycles after the corresponding data memory operation. This solution also enables the data memory operations to be performed without any delay. If this principle is used for the error detection code, a larger number of clock cycles is necessary to detect an error after an erroneous data has been read. This increases the number k of error propagation cycles and consequently the cost of the decontamination circuit. If this principle is used for the error correction code, the decontamination circuit will only be able to be enabled after a larger number of clock cycles necessary for correction of the read data.

In the above, we have considered that all the latches to which buffer registers are associated receive inputs at each clock cycle. However, in an assembly certain latches may be controlled by a halt signal that holds the latch when it is active. The latch therefore holds its previous cycle state when the halt signal is active. In other cases, the clock of a latch is derived from the system clock via a logic circuit, for example an OR gate, which receives the system clock signal and one or more logic signals on input and generates the latch clock ("gated clock") on output. These logic signals thus condition the clock of the latch which will be held during the cycles when these logic signals take certain values. This results in the latch holding its previous cycle state at each cycle during which its clock is disabled.

When the decontamination circuits are constructed, the different types of latch control signals, halt or other, or a clock conditioned by other logic signals (i.e. a "gated clock" type clock), must be taken into account. To do this we will proceed in the following manner:

In general, the logic signals that control a latch or condition a clock signal are generated by certain blocks of the system. Then, in the initial architecture of the system, i.e. before the decontamination circuits are inserted, the control signals of a latch and the signals conditioning its clock are considered as inputs of the latch in the same way as the signals that carry the write data in the latch. Thus, for the latches that are not held during decontamination, construction of the decontamination circuits will take account of these signals and will add the necessary circuits (as described previously) to generate the same values on these signals during the decontamination phase as in normal operation.

As far as the buffer (or FIFO) registers are concerned, in the above description, they are write enabled at each normal operation cycle and read enabled during predetermined cycles of the decontamination phase. This does not however take account of the case of the control signals of the latch associated to the FIFO register neither does it take account of the case of the clock conditioning signals of this latch. These signals may hold the latch during certain cycles of the operating phase and the FIFO register has to generate the same values on its output during decontamination as its associated latch generates in normal operation. To do this, one of the following techniques can be used:

The clock conditioning signals of the associated latch are ignored and the system clock (i.e. without conditioning) is sent to the FIFO during the operating phase and during the decontamination phase. The associated latch control signals are also ignored, i.e. these signals are not used in control of the FIFO either in normal operation or during decontamination. The FIFO is therefore always in write during normal operation and in read during the predetermined cycles of the decontamination phase, as described above. Thus, if the latch is held during a normal operation cycle (by the halt signal or by its clock), it keeps its previous value. This value is supplied to the FIFO during both cycles and is stored in the consecutive stages of the FIFO which will supply it on its output during the consecutive decontamination cycles. The FIFO will thus supply the same values during decontamination as those supplied by the associated latch during normal operation.

During normal operation, the latch control signal of the halt type is used to hold the FIFO at the same time as the associated latch, and the same clock is used for the FIFO as for the associated latch (i.e. of the halt type if this is the case). For operation during decontamination, two possible cases will be considered. In the case where the halt control signal of the associated latch and the clock conditioning signals of this latch take the same values during decontamination as in normal operation, the same halt signal and the same clock signal will also be used during decontamination for the FIFO. In the case where the halt control signal of the associated latch or the clock conditioning signals of this latch do not take the same values during decontamination and in normal operation (which can occur if these signals are not generated in the system or in the case where the latches of the stages generating these signals are not enabled during decontamination), a FIFO will then be used to store these signals during normal operation and to supply them to the system during the decontamination phase, by means of a multiplexer, as described above for other signals of the system. This FIFO will have the same number of stages and will be enabled during the same normal operation and decontamination cycles as the FIFO to which the halt signal and clock conditioning signals are to be sent.

The invention claimed is:

1. Assembly of electronic circuits, comprising:

at least one memory and means for detecting and correcting errors in the data supplied by the memory during a read operation, the output of the memory being connected in parallel to an input of an error detection circuit, to an input of an error correction circuit, and to the input of a first stage, the error detection circuit controlling transmission of the corrected data to the first stage after an error has been detected; the assembly wherein further comprises the memory being serially connected with a plurality of successive stages, and the output of the detection circuit controls decontamination means of the successor stages liable to be contaminated by an error before detection of the latter;

wherein each stage further comprises at least one latch, the output of the memory is connected to the input of the first stage by means of a first multiplexing circuit having an output connected to the input of the first stage, a first input connected to the output of the memory and a second input connected to the output of the correction circuit, and the output of the detection circuit being connected to a control input of the first multiplexing circuit and to a hold input of the latches of the successor stages so that detection of an error by the detection circuit simultaneously causes transmission of the data corrected by the correction circuit to the latch of the first stage by the first multiplexing circuit and holding of the latches of the successor stages.

2. Assembly according to claim 1, wherein the output of the first multiplexing circuit is connected to a first input of a first logic circuit comprising a second input designed to receive additional data and an output connected to the input of the first stage latch, the output data of the first logic circuit transmitted to the first stage latch being simultaneously a function of the data applied to its first and second inputs, a second multiplexing circuit comprising a first input designed to receive the additional data, a second input connected to the first input by means of an additional latch, an output connected to the second input of the first logic circuit, and a control input connected to the output of the detection circuit so that, the data applied to the first input of the second multiplexing circuit being normally transmitted to the second input of the first logic circuit, error detection by the detection circuit causes the data applied to the second input of the second multiplexing circuit to be transmitted to the second input of the first logic circuit.

3. Assembly according to claim 2, wherein the first multiplexing circuit comprises at least a third input designed to receive additional data, first, second and third control inputs designed to respectively receive first, second and third control signals, the first multiplexing circuit transmitting the additional data applied to its third input when the first control signal has a present first value, the data applied to its first input when, the first control signal having a preset second value, the second control signal supplied by the error detection circuit is representative of correct data, and the corrected data applied to its second input when the third control signal has a first preset value, the hold input of the latches of the successor stages and the third control input of the first multiplexing circuit being connected to the output of the detection circuit by means of a logic gate having another input receiving the first control signal so as to only cause transmission of the corrected data and holding of the latches of the successor stages when an error has been detected by the detection circuit during transmission of the data from the memory to the first multiplexing circuit.

4. Assembly according to claim 3, wherein the third control input of the first multiplexing circuit is connected to the output of the logic gate by means of an additional latch, another logic gate comprising an input connected to the output of the logic gate, an input connected to the output of the additional latch, and an output connected to the hold input of the latches of the successor stages.

5. Assembly according to claim 1, comprising means for replacing the erroneous data in the memory by corrected data supplied by the error correction means when an error has been detected.

6. Assembly according to claim 1, wherein the decontamination means comprise, associated to the memory, a multiplexer comprising an input directly connected to the output of the memory, an input connected to said output by means of a buffer register of FIFO type and an input connected to the output of the correction circuit.

7. Assembly according to claim 1, comprising a first code generating circuit having an input connected to the input of the memory and an output connected to the input of a code memory supplying a first code, the error detecting and correcting means comprising a second code generating circuit having an input connected to the output of the memory and supplying a second code, and means for comparing the first and second codes supplied by the code memory and by the second code generating circuit.

8. Assembly according to claim 7, wherein read and write operations of the code memory are delayed with respect to the corresponding operations of the data memory.

* * * * *